(12) United States Patent
Wessells et al.

(10) Patent No.: US 11,476,509 B1
(45) Date of Patent: *Oct. 18, 2022

(54) OPTIMIZATION OF ELECTROCHEMICAL CELL

(71) Applicant: Natron Energy, Inc., Santa Clara, CA (US)

(72) Inventors: Colin Deane Wessells, Menlo Park, CA (US); Daniel Friebel, San Carlos, CA (US); Peter Benjamin Herman, San Jose, CA (US); Grace Marjorie Yee, San Francisco, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,969

(22) Filed: Jan. 25, 2022

Related U.S. Application Data

(62) Division of application No. 17/232,484, filed on Apr. 16, 2021, now Pat. No. 11,309,594.

(51) Int. Cl.
| | |
|---|---|
| *H01M 4/58* | (2010.01) |
| *H01M 10/056* | (2010.01) |
| *H01M 10/42* | (2006.01) |
| *H01M 10/48* | (2006.01) |
| *H01M 4/40* | (2006.01) |

(52) U.S. Cl.
CPC .......... *H01M 10/484* (2013.01); *H01M 4/58* (2013.01); *H01M 10/4285* (2013.01);
(Continued)

(58) Field of Classification Search
CPC .......... H01M 10/484; H01M 10/4285; H01M 10/36; H01M 10/38; H01M 10/4214; H01M 50/569; H01M 4/58; H01M 4/40; H01M 4/52; H01M 4/521; H01M 4/523; H01M 4/525; H01M 2300/0002; H01M 2300/0005; H01M 2300/0008; H01M 2300/0011; H01M 2300/0014;
(Continued)

(56) References Cited

U.S. PATENT DOCUMENTS 9,099,718 B2    8/2015  Lu et al.

OTHER PUBLICATIONS

Wu et al., "Modification of Transition-Metal Redox by Interstitial Water in Hexacyanometalate Electrodes for Sodium-Ion Batteries," 2017, J. Am. Chem. Soc., 139, 18358-18364. (Year: 2017) (Year: 2017).*

(Continued)

*Primary Examiner* — Ula C Ruddock
*Assistant Examiner* — Matthew W Van Oudenaren
(74) *Attorney, Agent, or Firm* — Patent Law Offices of Michael E. Woods; Michael Woods

(57) ABSTRACT

A system and method for optimizing electrochemical cells including electrodes employing coordination compounds by mediating water content within a desired water content profile that includes sufficient coordinated water and reduces non-coordinated water below a desired target and with electrochemical cells including a coordination compound electrochemically active in one or more electrodes, with an improvement in electrochemical cell manufacture that relaxes standards for water content of electrochemical cells having one or more electrodes including one or more such transition metal cyanide coordination compounds.

5 Claims, 9 Drawing Sheets

(52) U.S. Cl.
CPC ...... *H01M 4/40* (2013.01); *H01M 2300/0002* (2013.01); *H01M 2300/0017* (2013.01); *H01M 2300/0025* (2013.01)

(58) Field of Classification Search
CPC . H01M 2300/0017; H01M 2300/0025; H01M 2300/0028; H01M 2300/0037
See application file for complete search history.

(56) References Cited

OTHER PUBLICATIONS

Imhof, R. In Situ Investigation of the Electrochemical Reduction of Carbonate Electrolyte Solutions at Graphite Electrodes. J. Electrochem. Soc., 145, 1081-1087 (1998).

Wu, J, et al, "Modification of Transition-Metal Redox byInterstitial Water in HexacyanometallateElectrodes forSodium-Ion Batteries" J. Am. Chem. Soc., 139, 18358-18364 (2017).

Wu, J, et al, "Modification of Transition-Metal Redox byInterstitial Water in HexacyanometallateElectrodes forSodium-Ion Batteries"—Supplemental Table—J. Am. Chem. Soc., 139, 18358-18364 (2017).

Wu et al., "Modification of Transition-Metal Redox by Interstitial Water in Hexacyanometalate Electrodes for Sodium-Ion Batteries," 2017, J. Am. Chem. Soc., 139, 18358-183694. (Year: 2017).

U.S. Appl. No. 17/232,484, filed Apr. 16, 2021, Colin Deane Wessells et al.

U.S. Appl. No. 17/579,739, filed Jan. 20, 2022, Colin Deane Wessells et al.

U.S. Appl. No. 17/647,307, filed Jan. 6, 2022, Colin Deane Wessells et al.

U.S. Appl. No. 16/708,213, filed Dec. 9, 2019, Heather Dawn Deshazer et al.

* cited by examiner

OPTIMIZATION OF ELECTROCHEMICAL CELL

CROSS REFERENCE TO RELATED APPLICATIONS

This Application is a Division of application Ser. No. 17/232,484 filed on Apr. 16, 2021, the contents of which is hereby expressly incorporated by reference in its entirety for all purposes.

FIELD OF THE INVENTION

The present invention relates generally to electrochemical cells including a coordination compound electrochemically active in one or more electrodes, and more specifically, but not exclusively, to improvement in electrochemical cell manufacture by relaxing standards for water content of electrochemical cells having one or more electrodes including one or more transition metal cyanide coordination compounds.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Electrochemical cells are often characterized as using electrolytes that fall into one of two classes: (i) aqueous electrolytes or (ii) non-aqueous electrolytes. Examples of the former include lead acid cells and nickel/metal hydride cells. Examples of the latter include lithium-ion cells. It is well established that in cells containing non-aqueous electrolytes, any trace water impurity, even at a low concentration of parts-per-million, will degrade the performance of the cell in one or more performance metrics. The solution is therefore to implement additional costly and energy-intensive process steps such as vacuum-drying solid cell components, treating electrolytes or electrolyte solvents with desiccants, and preventing re-uptake of moisture by maintaining rigorous dry room processes for all the subsequent process steps including cell assembly. Electrode components will be dried as much as possible in an effort to remove as much trace water as possible. This process adds to the complexity, risk, and resource costs in production of these cell stacks.

Regarding water content for non-aqueous electrolyte-containing cells, for example, see Reference [1]—Imhof, with FIG. 6 of Reference [1] illustrating that an increasing amount of ppm-level water impurity decreases the reversibility of a charging/discharging process of a graphite electrode in a Li-ion cell. This is a conclusion of Reference [1] on page 1087: "experiments with EC/DMC-based electrolytes containing different amounts of water have shown that the Li+ intercalation process becomes less reversible as the water content increases." (References specifically identified below and incorporated herein as noted.)

Some materials used as an electrode in an electrochemical cell may include use of a transition metal cyanide coordination compound (TMCCC). In principle, electrochemical cells with TMCCC electrodes can be designed to use either aqueous or non-aqueous electrolytes. Aqueous electrolytes would be preferred due to their low cost and superior ionic conductivity. However, using aqueous electrolytes makes it necessary to limit the design to electrochemical cells with relatively low voltages, typically less than 1.5 V, in order to prevent the electrolytic decomposition of water into hydrogen and oxygen. Therefore, reference [2] treats electrochemical cells using a TMCCC material as the positive electrode as belonging to the (ii) non-aqueous class. Reference [2] describes methods for drying TMCCC electrode materials to improve cell performance. In particular, Reference [2] teaches a manganese hexacyanoferrate (MnHCF) TMCCC electrode material that is dried to a low enough residual water content that all of the interstitial water is removed. When this occurs, the MnHCF material undergoes a phase transition from a cubic phase to a rhombohedral phase (column 8). When this phase change occurs, all of the electrochemical capacity of the MnHCF electrode is captured in a single charge-discharge plateau. Having a single reaction plateau is desirable because it allows an electrochemical cell to be operated in a narrower voltage range, decreasing the cost and complexity of integrating the cell into other electronic systems. To achieve this result, Reference [2] further describes the use of a vacuum drying process in which the vacuum pressure is below 0.1 torr (column 7 and claim 1).

Reference [2] includes a TMCCC in which a range of water may be present (z in a range of 0 to 3.5). However, column 8 describes in detail that all of the interstitial water must be removed from the structure to achieve the rhombohedral phase that has a single reaction plateau. Furthermore, in Reference [3] it is shown that the rhombohedral phase having a single reaction plateau is completely anhydrous. Throughout Reference [3], the single plateau phase is referred to as "anhydrated", as opposed to the "hydrated" phase having two reaction plateaus. Figure S2 is an idealized drawing of a unit cell, which cannot visualize the presence of a few % of vacancies and $H_2O$ associated with these vacancies. The main manuscript includes elemental analysis results that indicate $Na_{1.89}Mn[Fe(CN)_6]_{0.97}$ 1.87 $H_2O$ before and $Na_{1.89}Mn[Fe(CN)_6]_{0.97}$ 0.3 $H_2O$ after vacuum drying. Should this analysis method be 100% accurate, removing all non-coordinated but no coordinated water should result in z=0.18 instead of z=0.3, however this small difference of 0.12 is believed attributable to measurement errors. Therefore, one of ordinary skill in the art would consider the teachings of Reference [2] and Reference [3] to indicate that the rhombohedral, single-plateau phase is achieved when all of the water is removed from the structure, or in terms relevant to claim 1 of Reference [2], when z=0.

Note that "anhydrated" as used in Reference [3] is not a commonly used term. It is usually defined as the anhydrous form of a material that typically contains water. A reasonable interpretation of Reference [3] is that "anhydrated" is synonymous with "anhydrous", meaning a substance that contains no water or only a negligible quantity water as a trace impurity. In contrast, had Reference [3] referred to the vacuum dried MnHCF as "dehydrated", then it would be commonly understood that either some or all of the water initially present in the material had been removed.

In contrast to these disclosures, electrochemical cells that use TMCCC materials as an electrode may not exclusively fall into these aqueous or non-aqueous classes, e.g., when one or more TMCCC electrodes with a substantial water content are combined with a non-aqueous electrolyte. Optimization of operation of an electrochemical cell including TMCCC materials by managing the water content and assembly may be more complex than heretofore appreciated by conventional battery manufacturing techniques. For example, Reference [2] emphasizes on the advantage of having the same electrochemical potential for oxidation/reduction of Mn and Fe sites. While having a wider capacity range within a narrow potential range may seem attractive, no consideration of other battery performance criteria was made in Reference [2]. For example, Reference [2] does not mention whether any improvement of calendar or cycle life can be achieved with their anhydrous cathode material having a rhombohedral crystal structure, nor whether their electrode material can deliver an acceptably high portion of its capacity within a narrow potential window if it is discharged at any faster rate than the 10-hour discharge shown in Reference [2], FIGS. 6B and 7A.

Commercialization costs for some electrochemical cell manufacturers include manufacture or purchases of electrolytes. The higher the standard that is used for reducing water impurity levels in electrolytes having water, the greater the costs of those electrolytes which is directly related to consumer costs of completed cells, and thus ultimately on the adoption of these types of electrochemical cells.

What may be beneficial is a system and method for optimizing electrochemical cell manufacturing by reducing commercialization costs, including reduction of electrolyte costs used in their manufacturing.

BRIEF SUMMARY OF THE INVENTION

Disclosed is a system and method for optimizing electrochemical cell manufacturing by reducing commercialization costs, including reduction of electrolyte costs used in their manufacturing. The following summary of the invention is provided to facilitate an understanding of some of the technical features related to managing water content of electrolytes and of electrodes including TMCCC materials, and is not intended to be a full description of the present invention. A full appreciation of the various aspects of the invention can be gained by taking the entire specification, claims, drawings, and abstract as a whole. The present invention is applicable to other electrochemically active compounds in addition to TMCCC materials, particularly those that include water disposed in a crystal structure locations and water disposed in a non-coordinated manner.

Electrochemical cells in which energy storage is achieved by ion intercalation in transition metal cyanide coordination compounds (TMCCC) capable of co-intercalation of water have an advantage that the TMCCC materials may serve two important and concurrent/related functions: ion intercalation and removal of water from organic electrolytes. Partially dehydrating TMCCC electrodes, e.g., by vacuum-drying, prior to cell assembly allows for a substantial relaxation of specifications for the non-aqueous cell electrolyte regarding allowable concentration of water impurities. One reason is that the impurities will be absorbed, once specified correctly, into the TMCCC electrode material without any disadvantage to cell performance and cycle life. And these substantially relaxed specifications allow the material costs to be greatly reduced, further promoting use and development of these electrochemical materials and systems.

An embodiment of the present invention includes electrode materials that have a capacity to capture and release water within a total water budget for the electrodes that do not substantially degrade electrode operation. Contrary to what would be generally assumed by those skilled in the art, we found that many TMCCC materials require a substantial content of interstitial water in order to achieve optimal cell performance, and that such interstitial water does not substantially accelerate cell degradation when its amount is kept within an appropriate range. In contrast to a conventional view of a water impurity concentration that should be reduced as much as possible, electrochemical cells including an electrode having TMCCC active materials maintain water within upper and lower bounds, with some battery performance characteristics optimized at specified water concentrations.

An embodiment of the present invention includes removal of water from such electrode materials prior to assembly of an electrochemical cell in which the electrode operates in an electrolyte containing water. The electrodes are prepared pre-assembly, e.g., dehydrating the electrode materials to have a water content less than optimum, and then disposed in communication with a water-containing electrolyte having a pre-assembly water content greater than what could be commercially obtained at greater cost. After assembly, the desiccating character of the electrode removes water from the electrolyte to move the electrode towards more optimum operation while purifying the less-expensive electrolyte to produce a post-assembly electrochemical cell at lower overall cost. The same endpoint could be achieved by tight specification of the electrochemical components pre-assembly and implementing appropriate manufacturing facilities and conditions to maintain these water budgets so that the post-assembly specification is achieved. However, that latter process adds extra costs as compared to the use of the electrode as a desiccant.

An embodiment of the present invention may include improved manufacturing. As less aggressive water removal processes may be required, some of the processing steps may be simplified. For example, an aspect of the present invention includes assembly of an entire electrochemical cell, or a collection of such cells into a cell stack, one or more cells including at least one electrode with a TMCCC material having a water content outside desired range(s), and then optimizing the water in the assembled cell or cell stack. This is in contrast to dehydrating/hydrating the individual materials and then assembling using the dehydrated/hydrated materials.

An embodiment of the present invention may include a method of optimizing cell performance including dehydrating/hydrating at least one electrode to a controlled residual water content that includes a lower water concentration than desired for post-assembly operation and an electrolyte having a higher concentration of water than desired post-assembly (which reduces its cost for manufacture/purchase). The process of assembly of an electrochemical cell with these components in these states prior to the assembly allows the assembly process to transfer water from the electrolyte into one or more electrodes, which lowers the post-assembly concentration of water in the electrolyte while increasing a water concentration in the electrodes. A characteristic of TMCCC active materials in electrodes of electrochemical cells allows the increased water concentration to not degrade or appreciably negatively impact the desired electrochemical properties of the electrodes.

An embodiment of the present invention may include a composition of matter of an electrochemical cell in which one or more electrodes contain a set nonzero amount of water wherein a specific amount of water (i.e., greater than zero and less than a threshold), distinguished from electrochemical cells with one or more electrodes containing TMCCC materials having an undefined n>0 amount of water. The electrodes and electrolytes have a number of states including water concentrations for as-synthesized, pre-assembly (such as after partially drying the synthesized materials, and post-assembly electrolytes and electrodes.

A method for producing an electrochemical cell having an electrode configured to be disposed in communication with an electrolyte, may include configuring a pre-installation electrode to include an impurity-absorbing material, the pre-installation electrode having an initial set of electrical characteristics; and thereafter, communicating the pre-installation electrode with the electrolyte, the electrolyte including, prior to the communicating, an initial set of impurities at a pre-installation concentration; and thereafter; absorbing, with the pre-installation electrode, an impurity from the initial set of impurities; wherein the absorbing step removes the impurity from the electrolyte; and wherein the absorbing step configures, using the impurity, the pre-installation electrode as a post-absorption electrode; and wherein the post-absorption electrode includes a post-absorption set of electrical characteristics greater than the initial set of electrical characteristics. This impurity may be water and the impurity-absorbing material may include a TMCCC material in one or both of an anode electrode or a cathode electrode.

An electrochemical cell including a pre-communication electrolyte, including a pre-communication electrode including an impurity-absorbing material, the pre-communication electrode having an initial set of electrical characteristics prior to a communication of the pre-communication electrode to the pre-communication electrolyte; wherein the pre-communication electrolyte, configured for the communication to the pre-communication electrode, includes an initial set of impurities at a pre-communication concentration prior to the communication of the pre-communication electrode to the pre-installation electrolyte; and wherein the communication transfers an impurity from the initial set of impurities to the pre-communication electrode producing a post-absorption electrode; wherein the post-absorption electrode includes a post-absorption set of electrical characteristics greater than the initial set of electrical characteristics. The impurity may include water and the impurity-absorbing material may include a TMCCC material.

An electrochemical cell including a cell stack having a liquid electrolyte, an anode electrode, a separator, and a cathode electrode, the electrodes electrochemically communicated with the liquid electrolyte, with the cell stack having an as-synthesized set of properties, a pre-communication set of properties before the electrodes are electrochemically communicated with the liquid electrolyte, and a post-communication set of properties after the electrodes are electrochemically communicated with the liquid electrolyte; wherein the anode electrode and the cathode electrode each contain a transition metal cyanide coordination compound material having a composition conforming to formula I, formula I including $A_xP_y[R(CN)_6]_z(H_2O)_n$; wherein A represents an alkali cation and P and R each represent a multivalent transition metal cation; wherein $0.5<z<1$; and wherein $n=6*(1-z)+m_k$, with $n>0$, with $k=0$ to 4 identifying the as-synthesized material ($k=0$) and a set of states for the electrodes, and with $6*(1-z)$ associated with a quantity of coordinated water of the compound material, and with each $m_k>0$, each $m_k$ associated with a quantity of interstitial water of the compound material for one of the states of the electrodes, with each said quantity $m_k$ of interstitial water being equivalent to a weight percentage $M_k=m_k*W_{H2O}/W_{dry}*100\%$, with $W_{H2O}$ being the molecular weight of water and $W_{dry}$ being the molecular weight for the composition of formula I excluding all of its water content (or substantially all), with $M_0$ associated with an as-synthesized set of properties for said electrode, with $M_1$ associated with a pre-communication set of properties for the anode electrode, with $M_2$ associated with a pre-communication set of properties for the cathode electrode, with $M_3$ associated with a post-communication set of properties for the anode electrode, and with $M_4$ associated with a post-communication set of properties for the cathode electrode; and wherein the liquid electrolyte includes a polar organic solvent combined with an alkali metal salt and water having a water concentration, the water concentration including a pre-communication water concentration c1 and including a post-communication water concentration c2 and wherein c1>c2; wherein the as-synthesized set of properties includes $M_0$ up to 45% for formula I materials; wherein the $M_1$ includes a range between 1% and 12% for formula I materials of the anode electrode with $M_1 \le M_3$; wherein the $M_2$ includes a range between 1% and 12% for formula I materials of the cathode electrode with $M_2 \le M_4$; and wherein $M_3+M_4>M_1+M_2$. Note that this 45% is based on an extreme end of atomic compositions with $z=0.5$ and $M_k=4.0$, i.e., 2 $H_2O$ molecules per interstitial site. This value is 22.5% when the limit is set to $M_k=2.0$ instead. The dry molecular weight varies widely over the z range; for $Na_xMn^{II}_{1.0}[Mn^{II}(CN)_6]_z$ it is 160.5 g/mol at $z=0.5$ and 312 g/mol at $z=1.0$. This informs one of a meaningfulness of expressing $M_k$ in dry weight %.

An embodiment for the cell and the method may include c1<1,000 ppm and with c2<100 ppm or c2<100, the polar organic solvent may include a mononitrile (which may sometimes have the liquid electrolyte including a dinitrile as an additive), the anode and cathode formula I materials may be substantially the same or different, and permutations of values for $M_1$, $M_2$, $M_3$, and $M_4$ maintain the identified boundary conditions: $M_1 \le M_3$, $M_2 \le M_4$, and $M_3+M_4>M_1+M_2$. (e.g., $M_1=M_3$, $M_2=M_4$ or $M_1<M_3$ and $M_2<M_4$), and permutations and combinations thereof.

A method for assembling an electrochemical cell, including a) assembling a cell stack having a liquid electrolyte, an anode electrode, a separator, and a cathode electrode, the electrodes electrochemically communicated with the liquid electrolyte after the assembling step, with the cell stack having an as-synthesized set of properties, a pre-assembly set of properties before the electrodes are electrochemically communicated with the liquid electrolyte, and a post-assembly set of properties after the electrodes are electrochemically communicated with the liquid electrolyte; b) transferring water, responsive to the assembling step, from the liquid electrode to at least one of the electrodes; and c) decreasing, responsive to the transferring water step, a concentration of water in the liquid electrolyte; wherein the anode electrode and the cathode electrode each contain an active material including a transition metal cyanide coordination compound material having a composition conforming to formula I, formula I including $A_xP_y[R(CN)_6]_z(H_2O)_n$; wherein A represents an alkali cation and P and R each represent a multivalent transition metal cation; wherein $0.5<z<1$; and wherein $n=6*(1-z)+m_k$, with $n>0$, with $k=0$ to 4 identifying the as-synthesized material ($k=0$) and a set of states for the electrodes, and with $6*(1-z)$ associated with a quantity of coordinated water of the compound material, and with each $m_k>0$, each $m_k$ associated with a quantity of interstitial water of the compound material for one of the states of the electrodes, with each said quantity $m_k$ of interstitial water being equivalent to a weight percentage $M_k=m_k*W_{H2O}/W_{dry}*100\%$, with $W_{H2O}$ being the molecular weight of water and $W_{dry}$ being the molecular weight for the composition of formula I excluding all of its water content (or substantially all), with $M_0$ associated with an as-synthesized set of properties for said electrode, with $M_1$ associated with the pre-assembly set of properties for the anode electrode, with $M_2$ associated with the pre-assembly set of properties for the cathode electrode, with $M_3$ associated with the post-assembly set of properties for the anode electrode, and with $M_4$ associated with the post-assembly set of properties for the cathode electrode; and wherein the liquid electrolyte includes a polar organic solvent combined with an alkali metal salt and water having a water concentration, the water concentration including a pre-assembly water concentration $c_1$ and including a post-communication water concentration $c_2$ and wherein $c_1 > c_2$; wherein the as-synthesized set of properties includes $M_0$ up to 45% for formula I materials; wherein the $M_1$ includes a range between 1% and 12% for formula I materials of the anode electrode with $M_1 \leq M_3$; wherein the $M_2$ includes a range between 1% and 12% for formula I materials of the cathode electrode with $M_2 \leq M_4$; and wherein $M_3 + M_4 > M_1 + M_2$.

A method for assembling an electrochemical cell, including assembling a cell stack having a liquid electrolyte including a quantity of electrolytic water, an anode electrode, a separator, and a cathode electrode, the electrodes electrochemically communicated with the liquid electrolyte during the assembling step, with the cell stack having an as-synthesized set of properties, a pre-assembly set of properties before the electrodes are electrochemically communicated with the liquid electrolyte, and a post-communication set of properties after the electrodes are electrochemically communicated with the liquid electrolyte, wherein the sets of properties each include a water concentration of the electrolyte and a quantity of component water in a component coupled to the liquid electrolyte of the cell stack; coupling, during the assembling step, the liquid electrolyte to the component; and transferring, during the coupling step, a post-assembly quantity of electrolytic water to the component water; and reducing, responsive to the transferring step, the water concentration of the liquid electrolyte.

Advantages of some of the embodiments include an allowance for a reduction of production cost through a consolidation of separate dehydration processes for battery electrodes, electrolyte salts and electrolyte solvents into one or two process steps in which only the battery electrodes may be dehydrated. This is of particular advantage in using electrolytes made with organic solvents such as acetonitrile as solvent, because the manufacture of acetonitrile uses water as a process medium to isolate acetonitrile from its mixture with acrylonitrile, and further processing is needed to subsequently remove water from thus obtained acetonitrile. Furthermore, strict environmental humidity control may only be needed during cell stacking operations and not in the upstream process steps.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
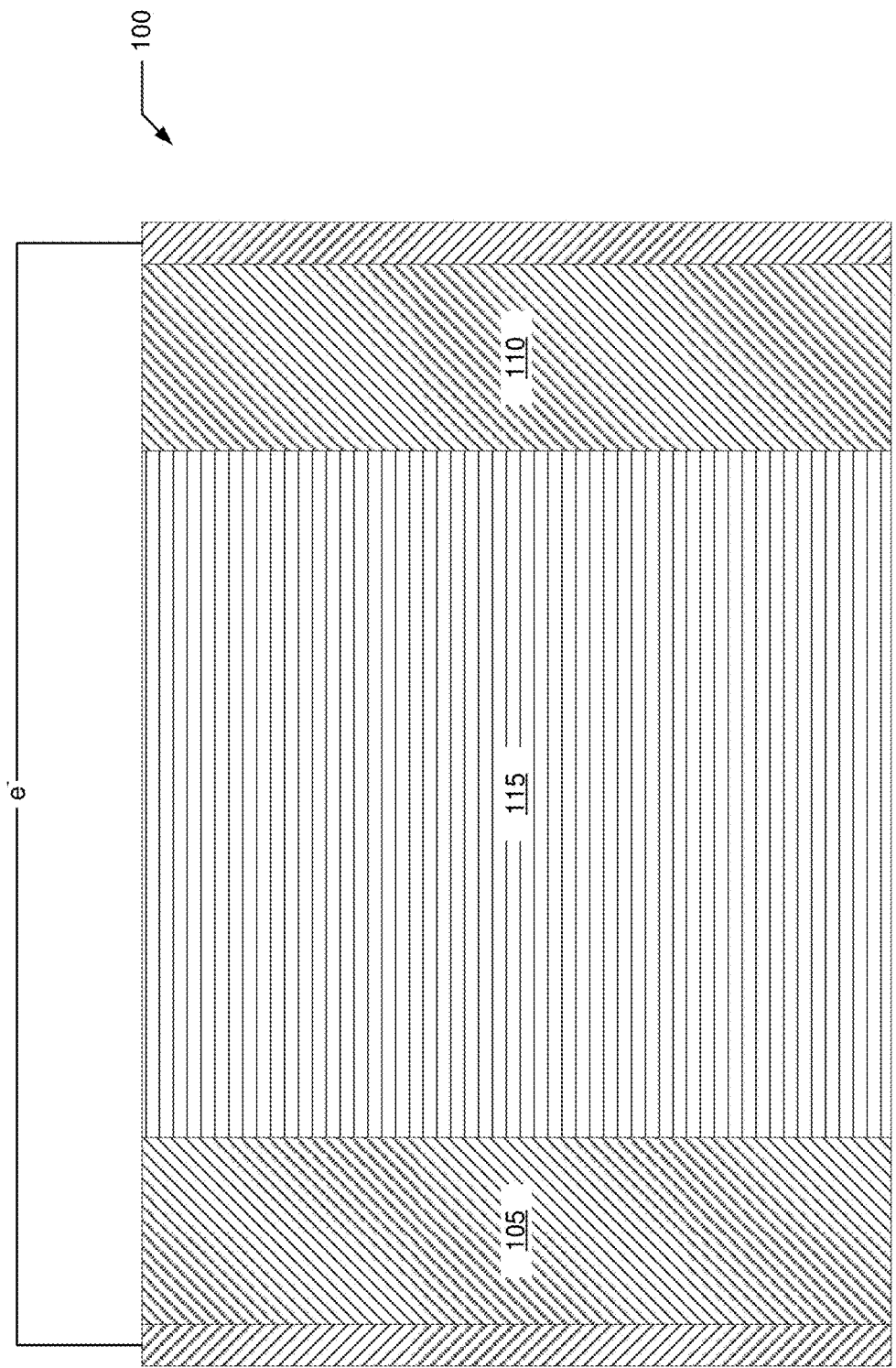
FIG. 1 illustrates a representative secondary electrochemical cell schematic having one or more TMCCC electrodes disposed in contact with a cosolvent electrolyte as described herein.

Embodiments of the present invention provide a system and method optimizing electrochemical cell manufacturing by reducing commercialization costs, including reduction of electrolyte costs used in their manufacturing. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to certain embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "residual water content" of a coordination compound, particularly a TMCCC material, refers to a total water content of the TMCCC. Residual water content includes a total water mass divided by a total dry mass of the TMCCC material (the mass of the metals, CN groups, and any other chemical species such as chelating species). For example, in the case of a TMCCC with a dry mass of 100 g and a total water content of 10 g, then the residual water content is calculated as 10 g water/100 g dry mass=10%.

As used herein, a water content of a class of coordination compound materials is a complex topic and refers to a hybrid residual water state which identifies a coordinated water content (e.g., coordinated water) and a non-coordinated water content (e.g., non-coordinated water). Non-coordinated water may be present in various ways, primarily as interstitial water and/or water bound to surfaces of particles of the coordination compound materials and/or water present in any pores or micropores within a TMCCC particle. As used herein, "coordinated water" is meant as an abbreviated term for "transition metal-coordinated water" and, as such, specifically describes water molecules that coordinate to transition metal atoms, and not to alkali metal ions. While the interaction between water and alkali metal ions could generally also be understood as "coordinated", water molecules that interact with alkali ions and not with transition metal atoms are considered herein, due to their relatively weak interaction, as belonging to the category of non-coordinated water. Coordinated water molecules are strongly bound to transition metal atoms that are deficient in cyanide ligands; therefore, coordinated water is considered essential for stabilizing TMCCC materials. Non-coordinated water above a threshold included in an optimally selected residual water content would be considered an undesired impurity that degrades the desired electrochemical properties. However, removing all non-coordinated water may result in poor alkali cation mobility in the TMCCC material, leading to diminished cell energy available for high-power discharge, with only marginal improvement of cycle or calendar life of the cell. Therefore, in addition to coordinated water, a certain amount of non-coordinated water is also necessary and desired. As discussed herein, absent sufficient care, water management processes (e.g., drying) may not sufficiently distinguish between coordinated and non-coordinated water in a compound coordination material. Coordination compound materials discussed herein may be used in a system including a water-containing electrolyte which may influence the water content of the coordination compound material after assembly or during use. A coordination compound having its residual water adjusted to a desired non-degrading water content range is referred to herein as a water mediated coordination compound material. Similarly, a coordination compound having its residual water outside this range is referred to herein as a water non-mediated coordination compound material.

As used herein, the term "aqueous" in the context of an electrolyte for an electrochemical cell means an electrolyte including water as a solvent and one or more dissolved materials with the water solvent having a concentration greater than 5%.

As used herein, the term "non-aqueous" in the context of an electrolyte for an electrochemical cell means an electrolyte including a solvent other than water, with either no water being present or water having a concentration less than 5%.

As used herein, the term "anhydrous" in the context of an electrolyte for an electrochemical cell means an electrolyte including a solvent other than water, water as a trace impurity having a concentration less than 0.01%.

As used herein, the term "drying" in the context of removal of water from a material, refers to removal of water to the greatest degree possible consistent with the drying process leaving water as a trace impurity at a concentration limited by the drying process actually used. Drying changes a material to an anhydrous state (therefore a dried material is an anhydrous material).

As used herein, the term "dehydrating" in the context of modifying a concentration of water in a material, refers to controllably reducing the water content to a desired level greater than a trace impurity. In contrast to drying, dehydrating contemplates retaining water as necessary desirable component of the material, for example, retaining all coordinated water and retaining a certain residual content of non-coordinated water.

As used herein, the term "hydrating" in the context of modifying a concentration of water in a material, refers to controllably increasing the water content to a desired level greater than a trace impurity, within target ranges needed for optimal performance and calendar life of an electrochemical cell.

As used herein, the term "mediating" in the context of modifying a concentration of water content in a coordination compound such as a TMCCC material includes dehydrating or hydrating the material to achieve a desired coordinated water concentration that enables the desired electrochemical properties. One way to consider water content quantity mediation is consideration of a mass fraction of water of a TMCCC material, including non-coordinated and coordinated water, both before and after mediation.

Described herein is a new class of battery cell that is based on electrodes that contain transition metal cyanide coordination compound (TMCCC) materials as electrochemically active materials. These TMCCC materials naturally contain water. Some of the water they contain is tightly bound to transition metal atoms within the crystal structure of the material, whereas non-coordinated water is less strongly bound as it resides in interstitial sites, or at the surface of the TMCCC material. Some of the non-coordinated water may reversibly move in and out of the electrode as it is charged and discharged. Water that leaves the TMCCC material may then undergo chemical or electrochemical reactions with other cell components and thereby cause degradation of cell performance. One would therefore expect that continued removal of non-coordinated water from the TMCCC material would continue to enhance electrode and cell performance by eliminating these undesirable reactions. However, we found that dehydration is beneficial only to a certain extent, beyond which it degrades the performance of the material. Embodiments of the present invention set the water content to a preferred level that retains not only all of the coordinated water, but also a substantial content of non-coordinated water.

An alternative to electrochemical cells as described herein, and methods for their assembly and use, predetermine desired levels of water in the components. Water impurities in electrolytes for battery cells can be eliminated by minimizing the water content of electrolyte components, and minimizing the exposure of these components to ambient humidity during the process steps of mixing electrolyte solutions, storage, transport, and filling battery cells with electrolyte.

A disadvantage of this alternative includes use of additional process steps such as vacuum-drying of electrolyte salts, drying electrolyte solvents over desiccants, regenerating the desiccant and avoiding impurities introduced by the contact between solvent and desiccant, are costly and may require additional downstream process modifications, such as handling dried salts and solvents in gloveboxes or dry rooms that are expensive to operate. Further, the purchase of materials that have been processed this way require a premium charge over purchase of materials that offer less rigorous manufacturing, handling, and end-use requirements.

In contrast, use of an embodiment of the present invention may allow for a reduction of production cost through the consolidation of separate dehydration processes for battery electrodes, electrolyte salts and electrolyte solvents into one or two process steps in which only the battery electrodes are dehydrated. This may be of particular advantage in using electrolytes made with organic solvents such as acetonitrile as solvent, because the manufacture of acetonitrile uses water as a process medium to isolate acetonitrile from its mixture with acrylonitrile, and further processing is needed to subsequently remove water from thus obtained acetonitrile. Furthermore, strict environmental humidity control is typically only needed during cell stacking operations and not in the upstream process steps.

Some of the content described herein is generally related to U.S. patent application Ser. No. 16/708,213, the contents of which are hereby expressly incorporated by reference thereto in its entirety for all purposes. One embodiment of an electrochemical cell of concern includes a TMCCC anode and a TMCCC cathode, and a liquid electrolyte electrically communicated to the electrodes. This liquid electrolyte is made with one or more organic solvents and at least one alkali metal salt, and may or may not contain additives. Preferred examples of solvents include acetonitrile, propionitrile, and butyronitrile for example. Preferred examples of alkali metal salts include suitable salts containing an alkali metal cation and an anion, wherein the alkali metal cation is sodium, potassium, rubidium or cesium, and anions include, but are not limited to, perchlorate, tetrafluoroborate, hexafluorophosphate, difluoro-oxalatoborate, triflate, bis(trifluoromethanesulfonyl)imide, bis(fluorosulfonyl)imide, dicyanamide, tricyanomethanide, and mixtures thereof. Preferred examples of sodium salts include sodium salts such as, but not limited to, sodium perchlorate, sodium tetrafluoroborate, sodium hexafluorophosphate, sodium difluoro-oxalatoborate, sodium triflate, sodium bis(trifluoromethanesulfonyl)imide, sodium dicyanamide, and sodium tricyanomethanide, and mixtures thereof. A preferred sodium salt includes sodium bis(trifluoromethanesulfonyl) imide. Examples of additives include malonitrile, succinonitrile, glutaronitrile, and adiponitrile with a mass ratio between solvent and additive between 99:1 and 70:30.

FIG. 1 illustrates a representative secondary electrochemical cell 100 schematic having one or more TMCCC electrodes disposed in contact with a cosolvent electrolyte as described herein. Cell 100 includes a negative electrode 105, a positive electrode 110 and an electrolyte 115 electrically communicated to the electrodes.

Figure 2:
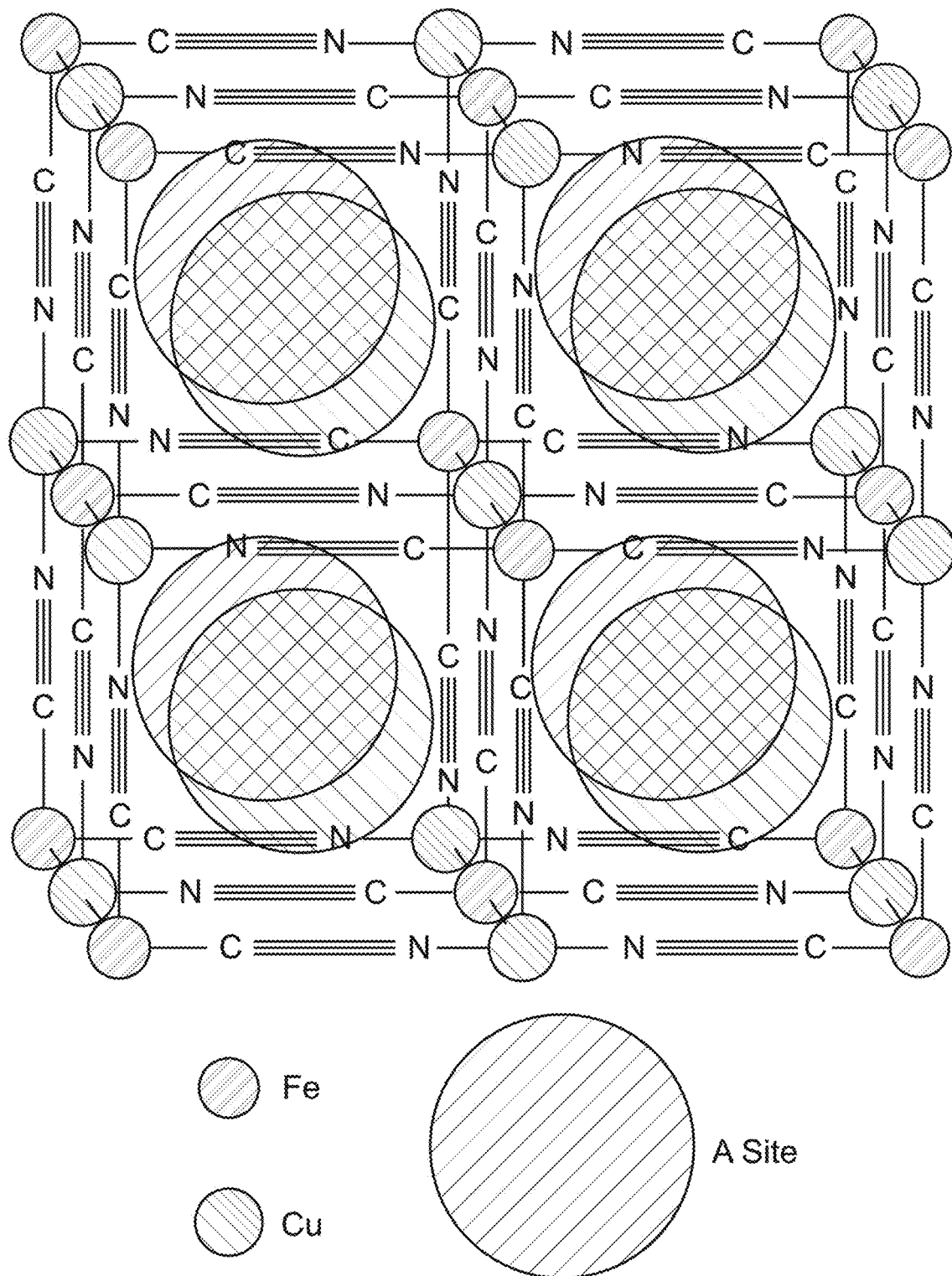
FIG. 2 illustrates a unit cell of a TMCCC crystal structure.

FIG. 2 illustrates a unit cell of the cubic Prussian Blue crystal structure, one example of a TMCCC structure. Transition metal cations are linked in a face-centered cubic framework by cyanide bridging ligands. The large, interstitial A sites can contain water and/or inserted alkali ions.

Figure 3:
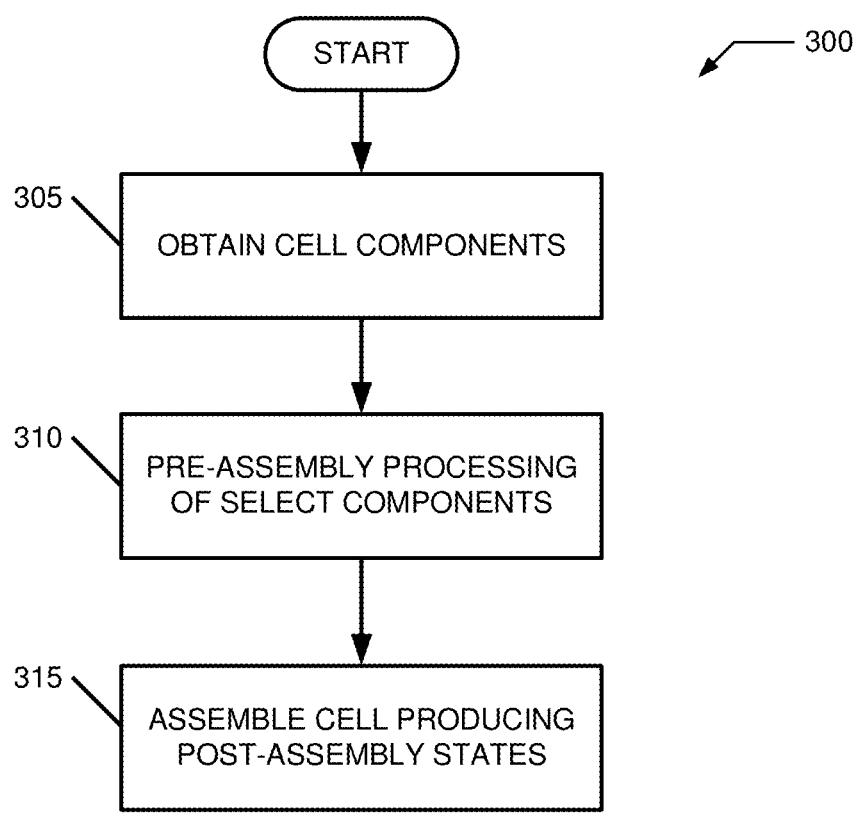
FIG. 3 illustrates a process sequence for cell optimization by use of one or more water absorbing TMCCC electrodes.

FIG. 3 illustrates a process sequence 300 for cell optimization by use of one or more water absorbing TMCCC electrodes including steps 305-315. In step 305, desired components of an electrochemical cell are obtained, such as through manufacture or purchase. For simplifying the discussions, two components of a cell stack for a secondary electrochemical cell including TMCCC active materials are described in process 305. These components include an electrode and an electrolyte. Further, this example scenario includes a chemical manufacturer synthesizing TMCCC active materials for the electrode and a third-party manufacturer producing an electrolyte to be used with the electrode and other components such as additional electrodes, binders, separators, additives, and the like. The TMCCC active material to be included in this electrode includes an "as synthesized" quantity of water that may be present in various forms, e.g., coordinated, interstitial, and surface. The electrolyte used with such an electrode will include, for this example, a combination of solvents, one of which is water which exceeds a quantity more than a "trace" or "impurity" quantity as discussed herein.

Step 310 includes pre-assembly processing of one or more components of the electrochemical (that is, before the electrodes are communicated to the electrolyte and other assembly of the final electrochemical cell are produced). In this example, the electrode is pre-processed to remove some of the as-synthesized water. In some cases, the water concentration of the electrode may be set or determined to a desired/acceptable level during synthesis so that a separate distinct step of adjusting the water concentration is not required.

Step 315 assembles the electrochemical cell from the components, including those that have been pre-processed. Some or all of the components of the cell have different water concentrations post-assembly from their pre-assembly water concentrations. For this example, water from the electrolyte is transferred to the water-reduced TMCCC electrode. This transfer results in the water concentration of the electrolyte decreasing and the water concentration in the electrode increasing during step 315.

Figure 4:
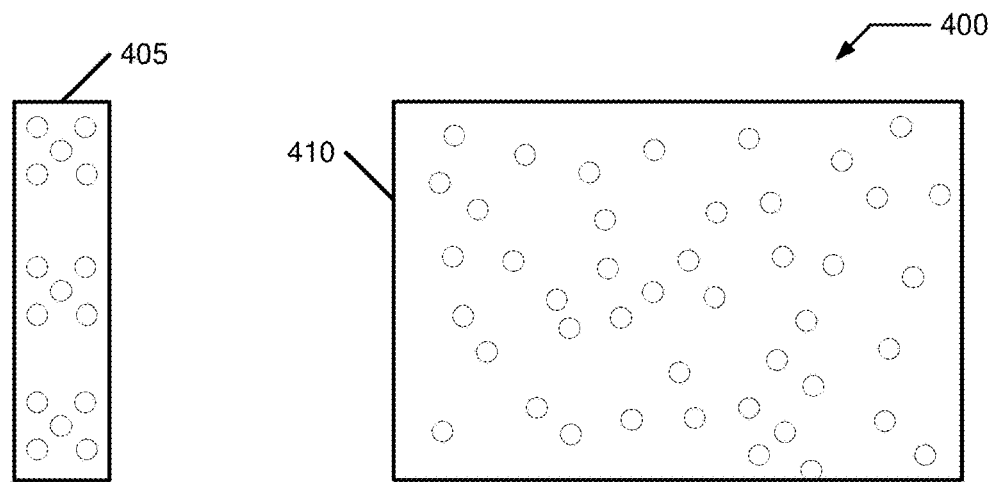
FIG. 4 illustrates a concept view of select electrochemical cell components in an "as synthesized" state for water concentrations for an electrode and an electrolyte.
Figure 5:
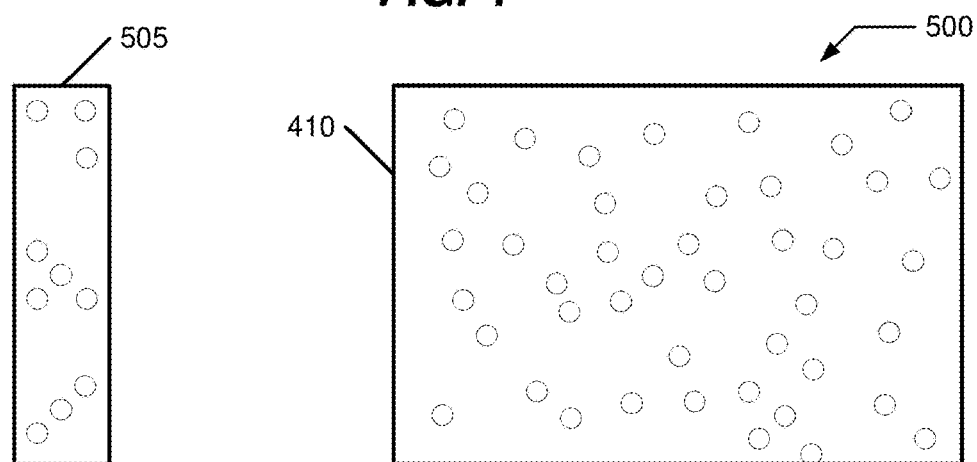
FIG. 5 illustrates the concept view of FIG. 4 with water concentration of an electrode adjusted from its as synthesized state illustrated in FIG. 4.
Figure 6:
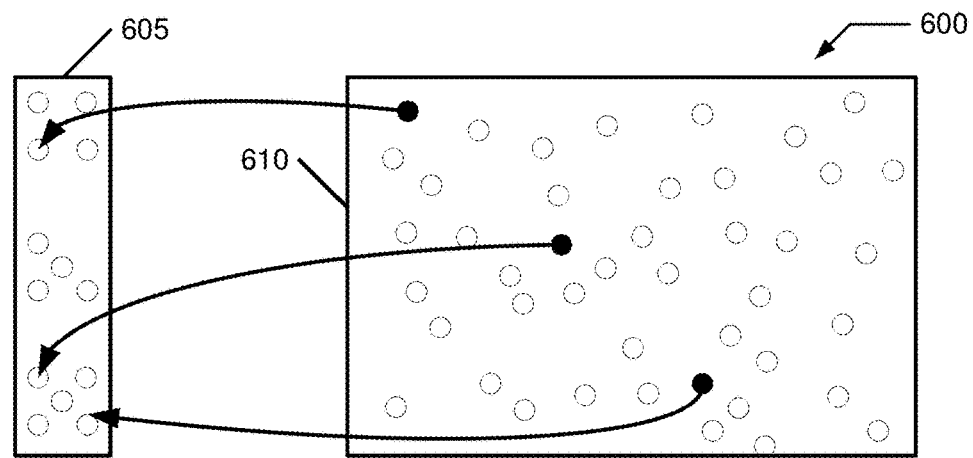
FIG. 6 illustrates the concept view of FIG. 5 with water concentrations of the electrode and the electrolyte each changing by a transfer of water from the electrolyte to the electrode.

FIG. 4-FIG. 6 illustrate a result of the process 300 in the context of one electrode and a simple electrolyte and that other implementations are possible as described herein. FIG. 4 illustrates a concept view of select components of an electrochemical cell 400 in an "as synthesized" state for water concentrations for an electrode and an electrolyte. These components include a TMCCC electrode 405 and a quantity of electrolyte 410. The small circles represent water that is present in the components.

FIG. 5 illustrates the concept view of FIG. 4 with a pre-assembly system 500 including a pre-assembly processing of electrode 405 of FIG. 4 to adjust it so that it is a water-adjusted (reduced) electrode 505 wherein the water concentration of electrode 405 is reduced from its as synthesized state. The fewer number of visualized small circles in electrode 505 of FIG. 5 represent this decreased water concentration for electrode 505 as compared to electrode 405 of FIG. 4.

FIG. 6 illustrates the concept view of FIG. 5 with a post-assembly system 600 including a post-assembly change in water concentrations of a post-assembly electrode 605 and a post-assembly electrolyte 610. As illustrated by the change in the number of small circles in electrode 605, a water concentration of electrode 605 is greater than pre-assembly electrode 505 (and may be more, less, or the same as the water concentration of as-synthesized electrode 405). Similarly, a water concentration of post-assembly electrolyte 610 is less than the water concentration of electrolyte 410 which in this example was obtained from a third party. These changes of water concentrations in system 600 include a transfer of water from electrolyte 410 to electrode 505 to produce the concentrations represented by FIG. 6.

TMCCC anodes and TMCCC cathodes used in a secondary electrochemical cell may be made in a precipitation reaction by mixing precursor solutions in water of transition metal salts, alkali metal salts, and either alkali cyanide or hexacyanometallate salts; examples of said precipitation reaction can be found in US 2020/0071175 A1, expressly incorporated by reference thereto in its entirety.

The as-synthesized materials typically contain substantial amounts of water that exists in three different forms: (i) water molecules physisorbed to the surface of TMCCC particles, (ii) water molecules in interstitial spaces of a regular TMCCC crystal lattice, and (iii) water molecules coordinated to transition metal sites with an incomplete coordination environment due to an adjacent hexacyanometallate vacancy. For each hexacyanometallate vacancy present in the TMCCC lattice, the six neighboring transition metal sites each lack one of six cyanide ligands; each of these transition metal sites then coordinates to one water molecule, thus maintaining a sixfold coordination environment. In the following, these three forms of water in (i)-(iii) may be referred to as (i) surface water, (ii) interstitial water, and (iii) coordinated water.

Typical non-coordinated water contents of TMCCC materials in their as-synthesized form can range from about zero to about 45% by anhydrous weight. The water content of synthesized TMCCC electrodes in an example electrochemical cell may be reduced by vacuum drying; however, the vacuum drying process is intentionally carried out in such a way that a still substantial amount of non-coordinated water is retained in the electrode materials, which typically is within a range from 1% to 12%.

Figure 7:
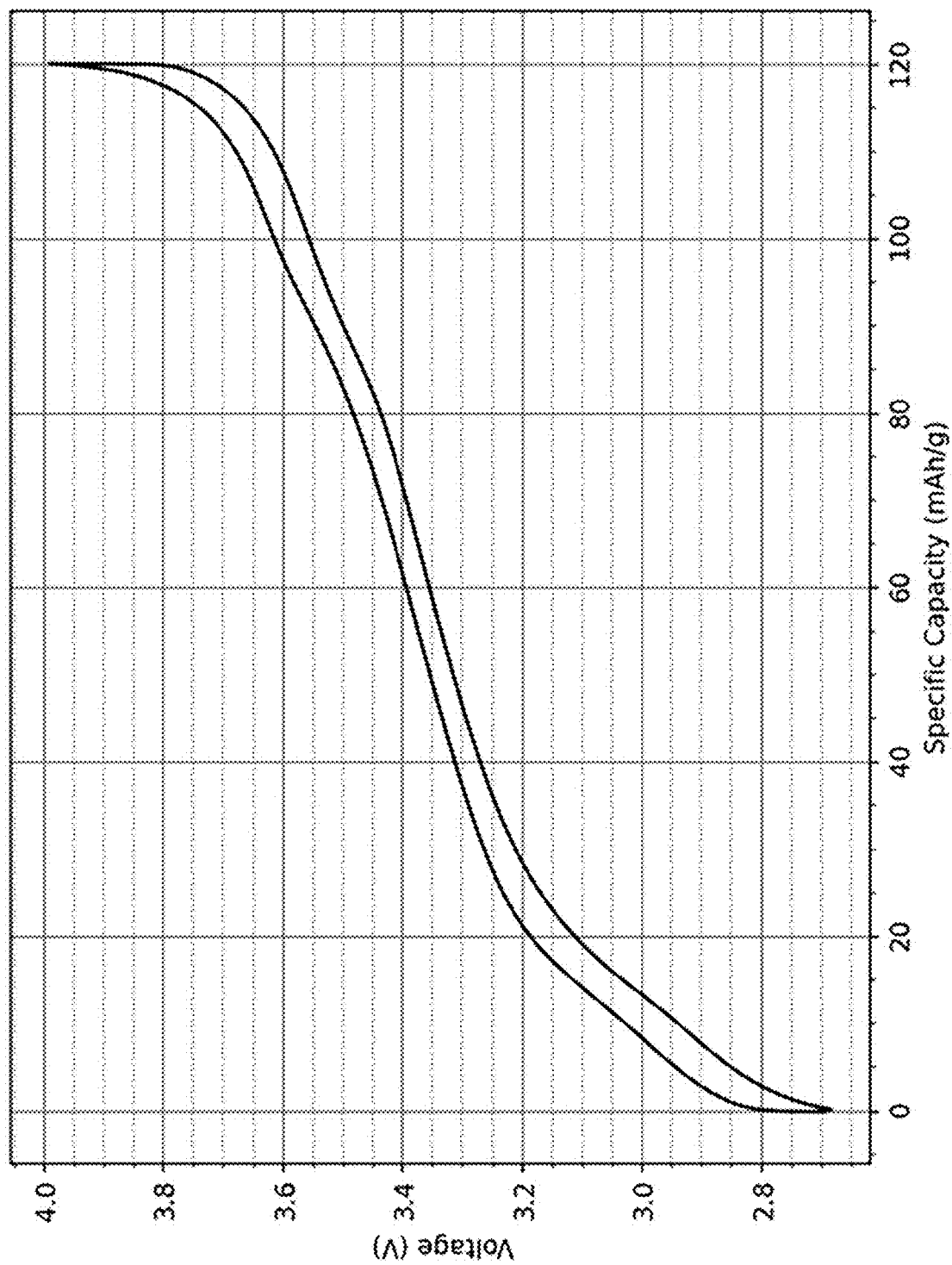
FIG. 7 illustrates a charge-discharge potential profile of a sodium manganese iron hexacyanoferrate cathode electrode with optimized interstitial water content, showing three distinct reduction/oxidation potentials for N-coordinated $Fe^{2+/3+}$, C-coordinated $Fe^{2+/3+}$ and N-coordinated $Mn^{2+/3+}$.
Figure 8:
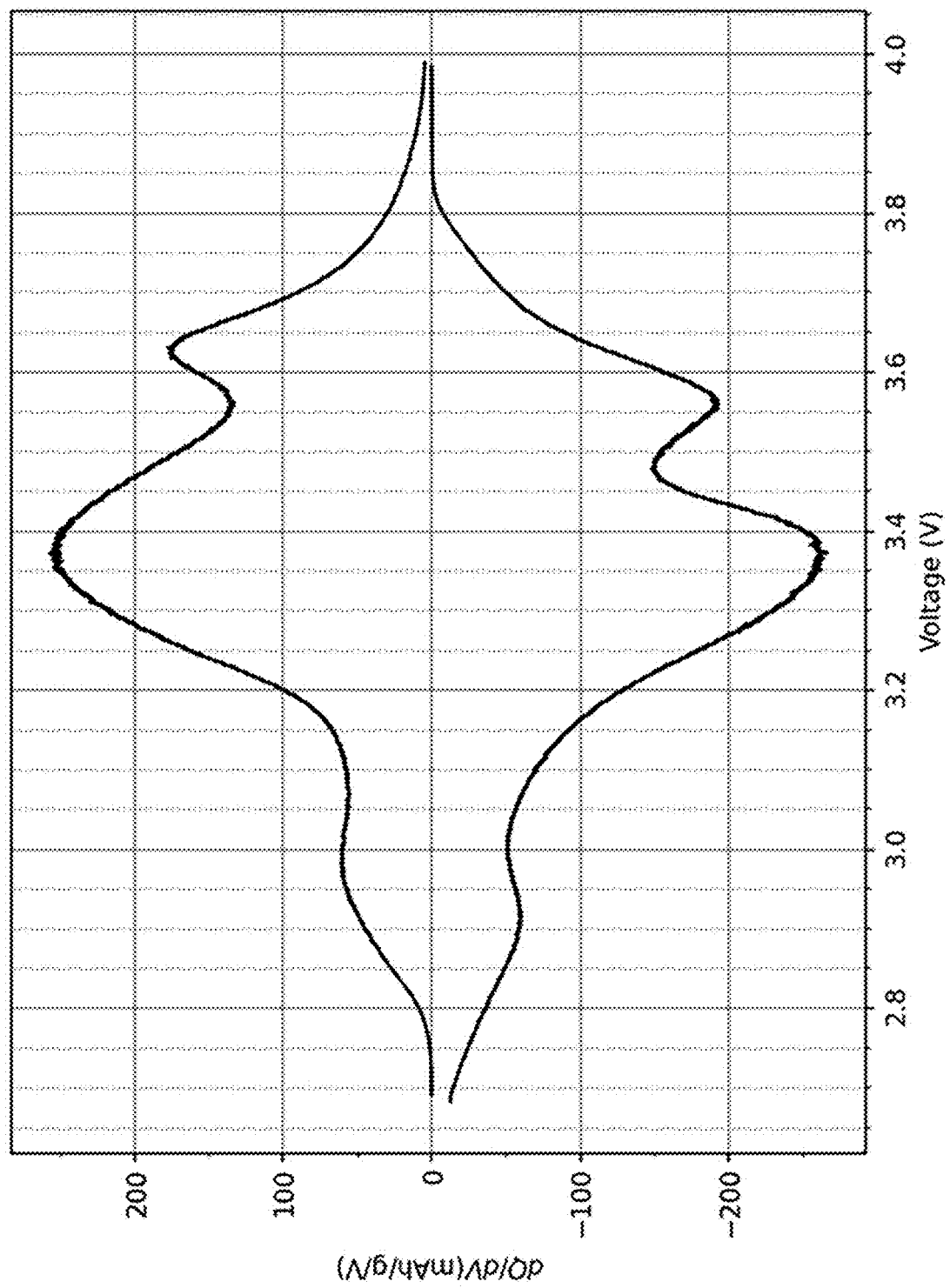
FIG. 8 illustrates a differential capacity plot derived from the potential profile in FIG. 7.

It is important to note there are several differences between compositions of matter disclosed in incorporated references US 2019/0190006 A1 and U.S. Pat. No. 9,099,718 B2, and the electrode compositions of matter described herein. In references US 2019/0190006 A1 and [2], cathode electrodes are dehydrated to the extent that all of their initial water content is removed with the exception of coordinated water, for example. By contrast, the residual water content in the TMCCC electrodes described herein is not limited to coordinated water, but a substantial amount of interstitial water is also retained. Typical partially dehydrated anodes in the battery cell described herein contain only between 0.7% to 5% residual water content as coordinated water, whereas the remaining portion, typically the majority, is in the form of interstitial water. Likewise, typical partially dehydrated cathodes described herein contain only between 4% and 6% (wt.) residual water content in the form of coordinated water, and an additional 0.5% to 5% of interstitial water is still present. The true amount of interstitial water can be expected to be even larger than the aforementioned values when the total water content is underreported by a Karl Fischer titration, whose accuracy relies on all of the water content being released upon heating. Heat-induced reactions that consume water, such as formation of metal oxides and hydrogen gas, are not uncommon in measurements of water content in solid materials, and lead to artificially lower readings in a Karl Fischer titration. Furthermore, reference [2] describes a TMCCC cathode material $A_x Mn[Fe(CN)_6]_y \cdot zH_2O$ in which the removal of interstitial water has caused the material to form a rhombohedral crystal structure, with $Mn^{2+/3+}$ and $Fe^{2+/3+}$ having the same reduction/oxidation potential. By contrast, our invention includes TMCCC materials having the same crystal structure in their as-synthesized and in their partially dehydrated forms, and it also includes TMCCC cathode materials having a cubic crystal structure and having three different oxidation-reduction potentials for nitrogen-coordinated $Fe^{2+/3+}$, carbon-coordinated $Fe^{2+/3+}$, and nitrogen-coordinated $Mn^{2+/3+}$. As an example, FIG. 7 shows a charge-discharge potential profile of a sodium iron manganese hexacyanoferrate electrode having a cubic crystal structure, which was dehydrated from an as-synthesized water content of 17% to a residual water content of 7.3%. Three distinct oxidation/reduction potentials are found at 2.95 V, 3.37 V and 3.6 V, respectively. FIG. 8 shows the differential capacity plot that is derived from the potential profile in FIG. 7. In comparing the composition of matter with the specific capacity at each of the three oxidation/reduction potentials, we found that the capacity measurements are in perfect agreement with an assignment the three redox potentials as nitrogen-coordinated $Fe^{2+/3+}$ (2.95 V), carbon-coordinated $Fe^{2+/3+}$ (3.37 V) and nitrogen-coordinated $Mn^{2+/3+}$ (3.6 V). An advantage of this composition of matter over a fully anhydrous sodium iron manganese hexacyanoferrate electrode having the same composition of matter except for its water content is that the presence of interstitial water not only prevents the formation of the rhombohedral structure, but it also maintains the cubic crystal structure of the electrode material throughout its entire range of sodium intercalation/deintercalation. One skilled in the art will recognize the advantages of an electrode material exhibiting solid-solution intercalation mechanism instead of a phase-change mechanism, where the former mechanism typically results in higher rate capability and longer cycle life. Furthermore, the presence of multiple reactions is desirable because it allows for differential coulometry techniques that enable more precise state of charge and state of health monitoring.

These partially dehydrated TMCCC electrodes may act as strong desiccants with substantial water absorption capacity when in contact with organic-solvent-based electrolytes that contain water as an impurity. Other materials systems that are known to intercalate water, such as zeolitic metal oxides, reach an equilibrium between interstitial water and ambient water in an electrolyte. That equilibrium can be described with a Langmuir isotherm or, if a distribution of absorption energies into non-equivalent sites is present, a convolution of several different Langmuir isotherms, similar to what has been reported for the water absorption of zeolite materials (R. Lin, A. Ladshaw, Y. Nan, J. Liu, S. Yiacoumi, C. Tsouris, D. W. DePaoli, and L. L. Tavlarides, Ind. Eng. Chem. Res. 2015, 54, 42, 10442-10448).

Generally, the distribution of water between its states of being dissolved in the electrolyte and being absorbed in the anode and/or cathode active material can be described with a mass-balance equation:

$$m_{H2O}^{cell} = x_0 m_E + y_0 m_C + z_0 m_A = x_1 m_E + y_1 m_C + z_1 m_A \quad (I)$$

wherein $m_{H2O}^{cell}$ is the total water content of all cell components, $m_E$, $n_C$ and $m_A$ are the masses of electrolyte, cathode active material and anode active material, respectively, $x_i$, $y_i$ and $z_i$ are the mass fractions of water in the electrolyte, the cathode active material and the anode active material, respectively, and the indices 0 and 1 refer to the initial and final distribution of water, such that index 0 describes a distribution in which an electrolyte with a higher water content $x_0$ is filled into a cell containing a stack of cathode and anode electrodes, wherein the cathode electrodes have been partially dehydrated to an initial residual water content $y_0$ and the anode electrodes have been partially dehydrated to an initial residual water content $z_0$. Upon equilibration between the cell components, water is redistributed, resulting in the distributions of $x_1$, $y_1$ and $z_1$. This equilibrium is spontaneously reached under a standard cell filling procedure in which electrolyte is added to the electrode stack, after which the cell pouch is heat-sealed and stored for a duration of hours.

Upon said redistribution of water from the cell electrolyte to the electrode active materials, the electrolyte water content is diminished by $$\Delta x = x_1 - x_0 = -\frac{\Delta y m_C + \Delta z m_A}{m_E} \quad (II)$$

In a typical cell design, the electrolyte volume is optimized in such a way that the porous structure of the cell stack is wetted, and pore volume and electrolyte volume are optimized to achieve high power, high energy density and long cycle life. Generally, the masses of active materials and electrolyte can be expected to be of the same or very similar order of magnitude. Since TMCCC electrodes can contain several percent by weight of interstitial water at equilibrium with electrolyte containing only trace impurities of water, very large values of $\Delta x$ can be achieved.

A preferred multi-layer pouch cell design with 4.5 Ah capacity contains approximately 62 g (by anhydrous mass) TMCCC anode active material, between 61 g and 70 g (by anhydrous mass) TMCCC cathode active material, and approximately 59 g liquid electrolyte. The electrolyte in said preferred cell design may contain up to 1000 ppm water by weight as an impurity ($x_0$); such water impurity may be introduced with one or more of the electrolyte components (electrolyte salt, solvents, additives) and/or with the process conditions of mixing the electrolyte, during which electrolyte salts, solvents, additives and/or their mixture may be exposed to a humid atmosphere. In said cell design with a cathode active material to electrolyte weight ratio between 1.05 and 1.2, the water content of electrolyte initially containing up to 1000 ppm water is diminished to 20 ppm or less upon contact with the cathode ($x_1$), with 20 ppm being the detection limit for water using Karl Fischer titration, whereas the water content of the cathode active material increases by no more than 800 ppm ($\Delta y$). Since the preferred total residual water content of an active material ($y_1$ or $z_1$) is between 6% and 9%, and the addition of less than 0.1% has no measurable effect on cell performance or cycle life, such a wide range of water impurities in the electrolyte as from 0 ppm up to 1000 ppm can be tolerated without needing to adjust the process conditions for dehydration of anode or cathode electrodes. This principle may be further extended to include an initial electrolyte water concentration $x_0$ of greater than 1000 ppm, and in some embodiments, of approximately 50,000 ppm, while still achieving a preferred final water distribution $x_1$, $y_1$, $z_1$.

The said function of TMCCC electrode materials as a desiccant is not limited to one particular composition of matter of a TMCCC material, but it can be achieved with any TMCCC cathode or anode material that has a substantial affinity towards absorption of interstitial water. Preferred examples of such interstitially hydrated TMCCC materials include hexacyanoferrates including but not limited to sodium manganese iron hexacyanoferrates, sodium iron hexacyanoferrates, sodium manganese hexacyanoferrates, sodium copper hexacyanoferrates, sodium nickel hexacyanoferrates, potassium nickel hexacyanoferrates, hexacyanomanganates including but not limited to sodium manganese hexacyanomanganates and sodium zinc hexacyanomanganates, and hexacyanochromates including but not limited to sodium manganese hexacyanochromate. Particularly preferred cathode TMCCC materials are sodium manganese iron hexacyanoferrates with a composition $Na_{2-s-p-(4-s)q}Mn^{II}_{1-p}Fe^{III}_{p}[Fe^{II+s}(CN)_6]_{1-q}(H_2O)_{6q+r}$, wherein $0 \leq p \leq 1$, $0 \leq q \leq 0.5$, $r \geq 0$, and $0 \leq s \leq 1$. Particularly preferred anode TMCCC materials are sodium manganese hexacyanomanganates with a composition $Na_{2-4q}Mn[Mn(CN)_6]_{1-q}(H_2O)_{6q+r}$, wherein $0 \leq q \leq 0.5$ and $r \geq 0$.

In another preferred cell design, an electrolyte with even higher water content on the order of several percent can be used, when the dehydration process for the electrodes is adjusted accordingly to avoid higher than preferred total water content of the cell. In this case, one or both of the anode and cathode electrodes is initially dehydrated to a residual water content that is intentionally lower than the water content that is targeted for optimal cell performance. Said optimum water concentrations in the electrode active materials are then gained back upon exposure of the "over-dried" electrode stack to the electrolyte.

In one preferred cell design, a TMCCC cathode is used and the optimum residual water content in said TMCCC cathode is 6.4%, of which 4.8% water is present as coordinated water and 1.6% is present as interstitial water, the anode in this cell design is dehydrated to an optimum residual water content of 7.5%, the TMCCC cathode is over-dried to 5.3% residual water content and electrolyte with an initial water content of 12,000 ppm is used.

In another preferred cell design, the TMCCC cathode is used and dehydrated to its optimum residual water content of 6.4%, and a TMCCC anode, containing 2.2% coordinated water and, for optimum cell performance and cycle life, 5.4% interstitial water, is dehydrated to 3.1% residual water content, and the resulting cell is filled with electrolyte containing 42,000 ppm water.

Many other variations of this type of cell design can be practiced, in which electrolytes with substantial initial water content, ranging up to 50,000 ppm, can be effectively desiccated when appropriate TMCCC electrode materials with low initial water content and large water absorption capacity are employed.

In addition, variations of this type of cell design could incorporate one or electrodes each of which comprising a combination of one or more TMCCC materials and another electrochemically active electrode material. In such a variation, said one or more TMCCC materials could be introduced as a component to the electrode in a concentration of 1% to 10% or more, and said electrodes may contain another electrochemically active electrode material including but not limited to carbons such as graphite or hard carbon, metallic and intermetallics such as sulfur and silicon, or ceramics such as transition metal oxides or phosphates, including but not limited to lithium transition metal oxides such as lithium cobalt oxide, lithium manganese oxide, or lithium nickel cobalt manganese oxide, or lithium transition metal phosphates such as lithium iron phosphate, and including but not limited to sodium transition metal oxides or phosphates, including but not limited to sodium titanium phosphate and oxides containing sodium, nickel, and optionally one or more other transition metals. In such as variation, the TMCCC component of said electrode would absorb water from the electrolyte as described herein, enhancing the performance of the cell or said another electrochemically active electrode material.

Example 1: Karl Fischer Titration of Electrolytes Before and After Contact with TMCCC Cathode Three electrolytes with a concentration of 0.88 M NaTFSI in acetonitrile and with a systematic variation of water content were made, referred to hereafter as electrolytes a, b and c. Electrolyte a was taken from a stock solution made with high-purity acetonitrile and NaTFSI salt, whereas electrolytes b and c were made by intentionally adding small amounts of water to aliquots taken from electrolyte a, in order to obtain target water concentrations of 500 ppm and 1000 ppm in electrolytes b and c, respectively.

Each of the electrolytes a, b and c was exposed to a partially dehydrated TMCCC cathode. For this purpose, cathode electrodes made with hydrated sodium manganese iron hexacyanoferrate as the active material, with an active material mass loading of approximately 15.3 mg/cm$^2$ by anhydrous active material weight, an area of approximately 385 cm$^2$, calendared to a porosity of approximately 35%, were vacuum-dried to a residual water content of 7.2%±0.1% by active material weight.

For each electrolyte exposure test, one of the said cathode electrodes was placed inside a laminated aluminum pouch, and a volume of electrolyte twice as large as the pore volume of the electrode was added. The pouches were then heat-sealed and stored overnight, after which they were cut open and the excess electrolyte volume collected for Karl Fischer titration.

Table 1 illustrates the measured water content in electrolytes a, b and c before and after exposure to partially dehydrated cathode electrodes. Illustrated is a desiccant effect of sodium manganese iron hexacyanoferrate cathodes in contact with 0.88 M NaTFSI/acetonitrile electrolytes with different initial water concentrations. Electrolyte H$_2$O concentrations before and after exposure are measured by Karl Fischer titration; the H$_2$O absorption of the cathode samples is calculated from the H$_2$O concentration change in the electrolyte. In each of the three electrolyte samples, regardless of their initial water content, the water content after exposure was diminished to the detection limit of the Karl Fischer titration.

TABLE 1

Desiccant effect

| Electrolyte | $H_2O$ before exposure to cathode (ppm) | $H_2O$ after exposure to cathode (ppm) | Calculated cathode $H_2O$ absorption (% wt. of active) |
|---|---|---|---|
| a | 59 | 16 | 0.005 |
| b | 491 | 23 | 0.05 |
| c | 1009 | 22 | 0.09 |

Example 2: Karl Fischer Titration of Electrolytes Before and After Contact with TMCCC Anode Three electrolytes with a concentration of 0.88 M NaTFSI in acetonitrile and with a systematic variation of water content were made, referred to hereafter as electrolytes d, e and f. The electrolytes were made using the same procedure as for electrolyte a in Example 1, followed by additions of small amounts of water in order to reach target water concentrations of 100 ppm, 1000 ppm and 10000 ppm, respectively. Each of the electrolytes d, e and f was exposed to a partially dehydrated TMCCC anode. In addition to electrolyte exposure to partially dehydrated anodes directly obtained from the vacuum-drying process, the effect of anode SOC was also tested.

Anode electrodes made with hydrated sodium manganese hexacyanomanganate as the active material, with an active material mass loading of approximately 14.8 mg/cm², an area of approximately 385 cm², calendared to a porosity of approximately 28%, were vacuum-dried to a residual water content of 7.5%.

Three anodes with an SOC of 0% were directly obtained from the vacuum-drying process and exposed to electrolytes d, e, and f using the same procedure as in Example 1. Additional anodes from the same drying batch were built into multilayer pouch cells using sodium manganese iron hexacyanoferrate cathodes with 6.8% cathode residual water content. These cells underwent 1C-1C charge-discharge cycles and were stopped at appropriate voltages to obtain anode SOCs of 50%, 80% and 100%, respectively. The thus prepared anodes were harvested from their cells and subjected to the same soaking protocol as the 0% SOC anodes.

Table 2 illustrates an electrolyte water content in electrolytes d, e and f before and after exposure to partially dehydrated anodes at four different anode states of charge. At the given initial residual water content of 7.5% in the anode, the corresponding equilibrium water concentration in the electrolyte is 128 ppm. While this indicates a lower affinity of the anode material towards water absorption, we still observe substantial removal of water from electrolytes with higher initial concentrations of 1017 and 9983 ppm. It is noteworthy that the anode in this example has a much higher initial concentration of interstitial water (6.5%) prior to electrolyte exposure than the cathode in Example 1 (2.4%), and still exhibits substantial absorption capacity. An additional benefit can be seen in Table 2, which illustrates that the state of charge of this electrode material does not significantly affect its water absorption capacity, allowing the cell to be assembled at any state of charge while still retaining the ability to capture water from an electrolyte.

Described is a desiccant effect of sodium manganese hexacyanomanganate anodes at different SOCs in contact with 0.88 M NaTFSI/acetonitrile electrolytes with initial water concentrations. Electrolyte $H_2O$ concentrations before and after exposure are measured by Karl Fischer titration; the $H_2O$ absorption of the anode samples is calculated from the $H_2O$ concentration change in the electrolyte.

TABLE 2

Desiccant effect

| Electrolyte | Anode SOC (%) | $H_2O$ before exposure to anode (ppm) | $H_2O$ after exposure to anode (ppm) | Calculated anode $H_2O$ absorption (% wt. of active) |
|---|---|---|---|---|
| d | 0 | 128 | 98 | 0.003 |
| d | 50 | 128 | 128 | 0.000 |
| d | 80 | 128 | 130 | 0.000 |
| d | 100 | 128 | 128 | 0.000 |
| e | 0 | 1017 | 134 | 0.09 |
| e | 50 | 1017 | 172 | 0.07 |
| e | 80 | 1017 | 213 | 0.07 |
| e | 100 | 1017 | 236 | 0.07 |
| f | 0 | 9983 | 1730 | 0.72 |
| f | 50 | 9983 | 1429 | 0.75 |
| f | 80 | 9983 | 1919 | 0.70 |
| f | 100 | 9983 | 1876 | 0.71 |

Example 3: Cell Design with Electrolytes Containing Different Water Impurity Levels Cathode electrodes made with hydrated sodium manganese iron hexacyanoferrate were partially dehydrated to a residual water content of 7.1%±0.1% using the same vacuum drying process as in example 1. Anode electrodes made with hydrated sodium manganese hexacyanomanganate as the active material, with an active material mass loading of approximately 14.8 mg/cm² and an electrode porosity of approximately 28%, were vacuum-dried for 70 minutes at 80° C. to a residual water content of 7.8%±0.1%. Anode and cathode electrodes were stacked and formed into multi-layer pouch cells. Three different groups A, B and C of cells were made with different electrolytes. The electrolytes used in cell groups A, B and C had the same compositions as the electrolytes a, b and c in example 1, respectively. All three groups of cells were subjected to an accelerated cycle age test at 45° C., during which they were continuously floated at a maximum voltage of 1.81 V and fully discharged at a 2.2C rate once daily.

Figure 9:
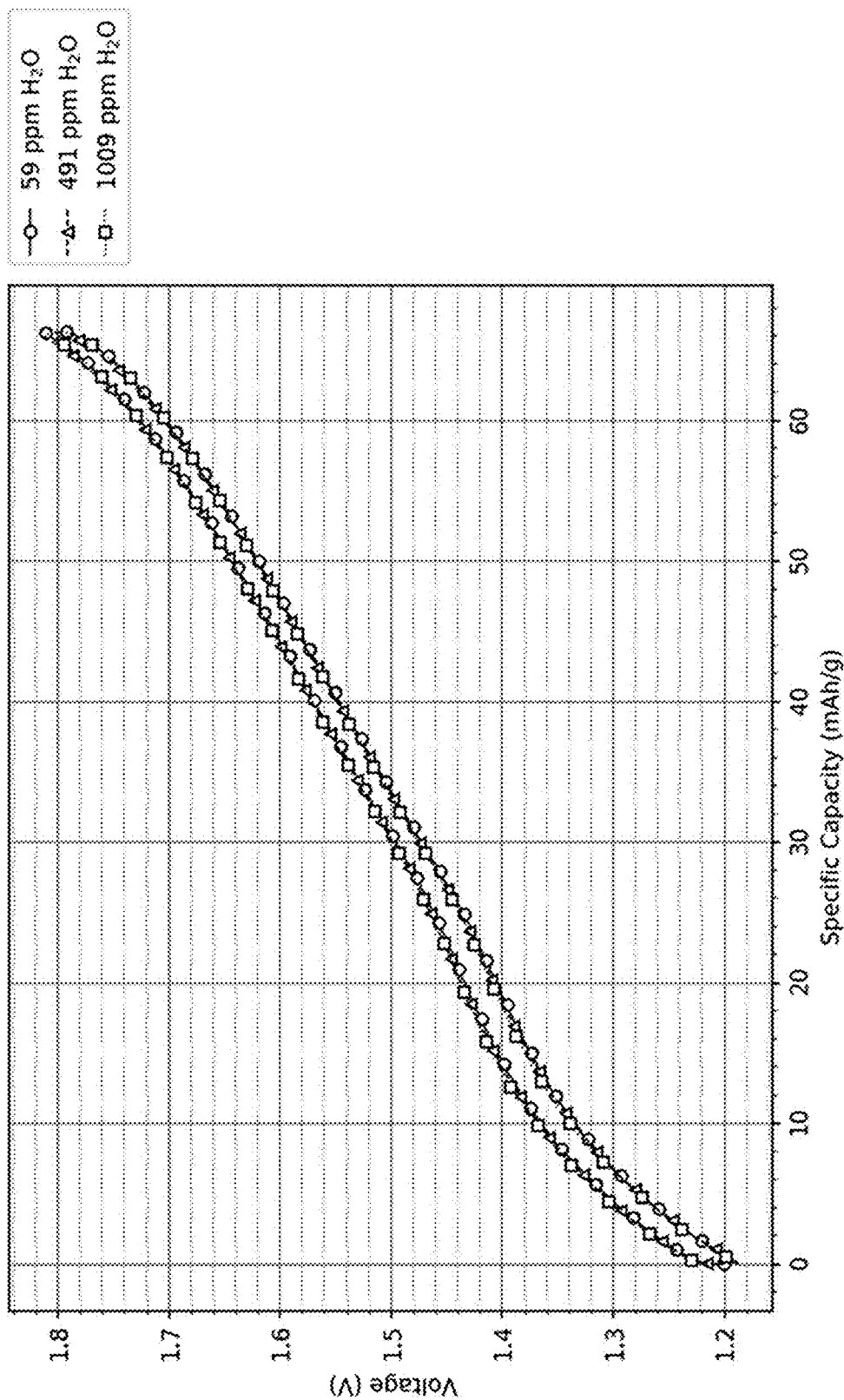
FIG. 9 illustrates charge-discharge profiles of cells with TMCCC electrodes and electrolytes with varied water content.

FIG. 9 illustrates the initial 1C-1C voltage profiles of cells from groups A, B and C.

Figure 10:
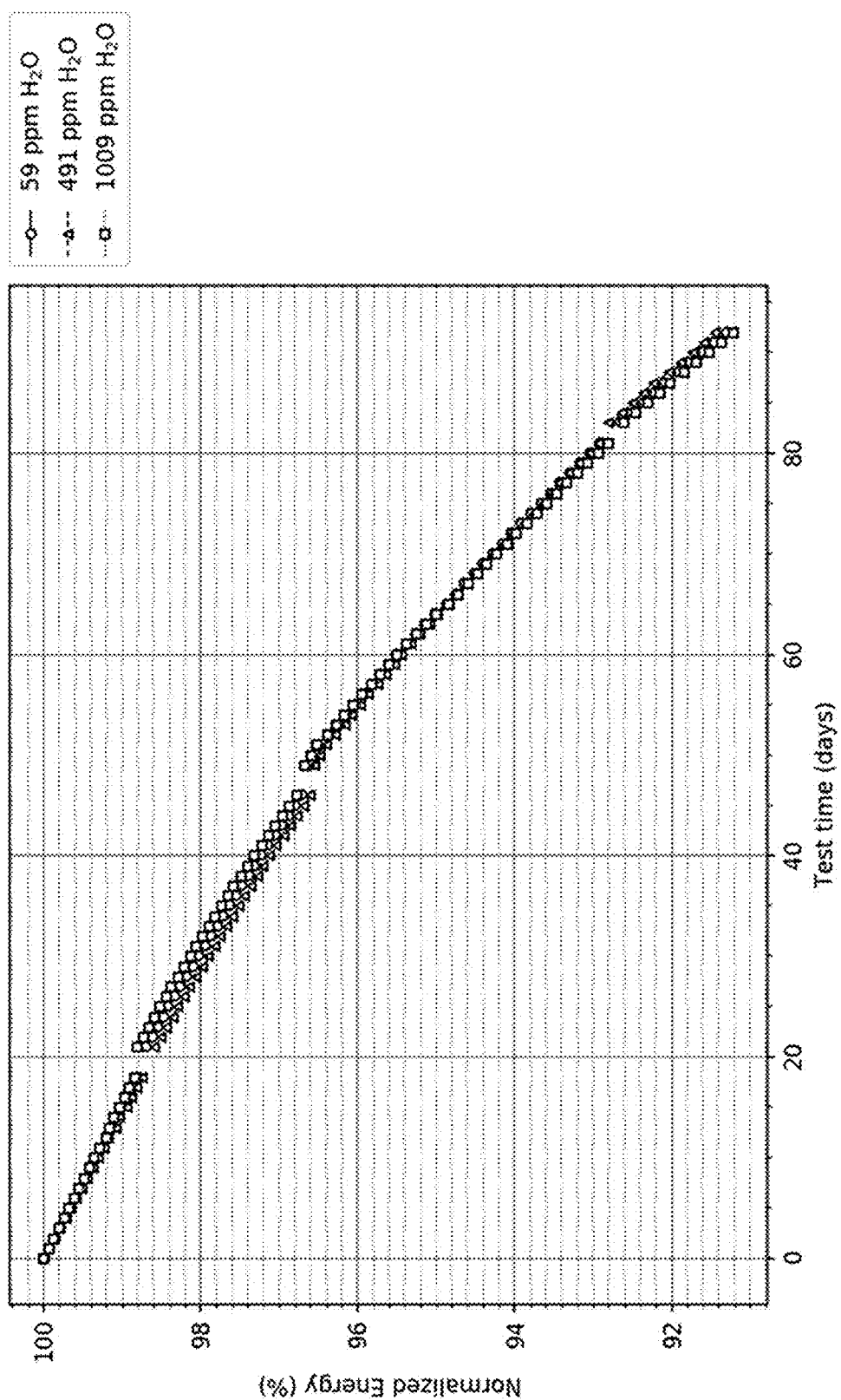
FIG. 10 illustrates cell energy versus time during float testing.

FIG. 10 illustrates the cell energy versus time for cells from groups A, B, and C, measured during the accelerated cycle age test at 45° C.

Figure 11:
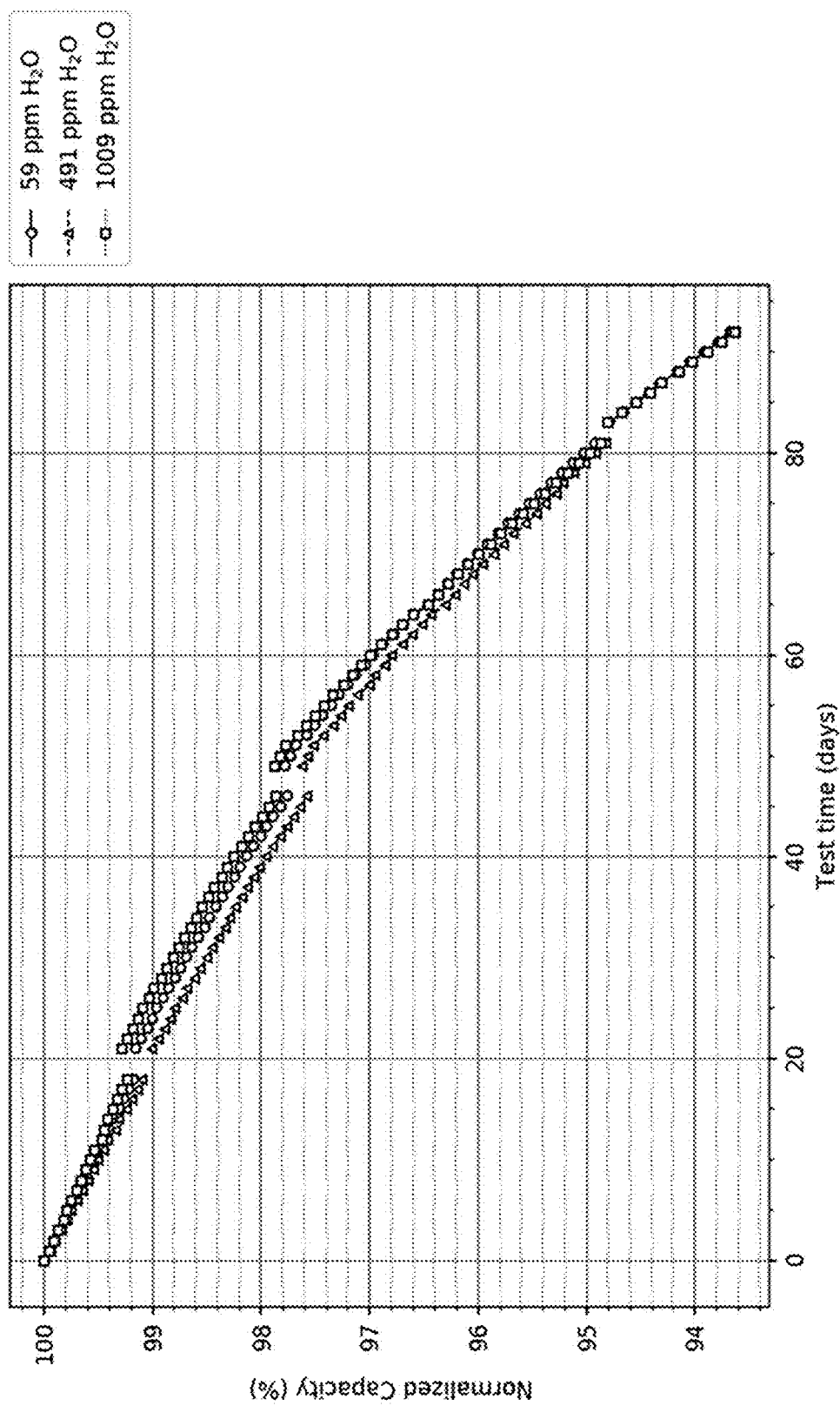
FIG. 11 illustrates cell capacity versus time during float testing.

FIG. 11 illustrates the cell capacity versus time for cells from groups A, B, and C, measured during the accelerated cycle age test at 45° C.

No differences were observed between the initial 1C-1C voltage profiles of cells with varied electrolyte water content, and during 3 months of accelerated cycle-aging the performance of the three different groups was indistinguishable in terms of energy fade and capacity fade. These observations are consistent with the desiccant property of the cathode material demonstrated in Example 1. The added water in the 491 ppm and 1009 ppm groups is entirely absorbed by the cathode, and the differences in resulting cathode water introduced with the electrolyte are less than 0.09% between the groups; these differences are within typical process variations of electrode vacuum drying and their effect on cell performance or cell life are negligible.

References—expressly incorporated herein by reference thereto:

Reference [1]—Imhof, R. In Situ Investigation of the Electrochemical Reduction of Carbonate Electrolyte Solutions at Graphite Electrodes. J. Electrochem. Soc., 145, 1081-1087 (1998)

Reference [2]—U.S. Pat. No. 9,099,718 B2 (Lu '718)

Reference [3]—Wu, J, et al, J. Am. Chem. Soc., 139, 18358-18364 (2017),

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention is not limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method for assembling an electrochemical cell, comprising the steps of:
    assembling a cell stack having a liquid electrolyte including a quantity of electrolytic water, an anode electrode, a separator, and a cathode electrode, said electrodes electrochemically communicated with said liquid electrolyte during said assembling step, with components of said cell stack having an as-synthesized set of properties, a pre-assembly set of properties before said electrodes are electrochemically communicated with said liquid electrolyte, and a post-communication set of properties after said electrodes are electrochemically communicated with said liquid electrolyte, wherein said sets of properties each include a water concentration of said liquid electrolyte and a quantity of component water in a component coupled to said liquid electrolyte of said cell stack;
    coupling, during said assembling step, said liquid electrolyte to said component; and
    transferring, during said coupling step, a post-assembly quantity of electrolytic water to said quantity of component water; and
    reducing, responsive to said transferring step, said water concentration of said liquid electrolyte.

2. The method of claim 1 wherein said water concentration of said liquid electrolyte of said pre-assembly set of properties includes a concentration $c1$ with said concentration $c1<1,000$ ppm, and wherein said water concentration of said liquid electrolyte of said post-communication set of properties includes a concentration $c2$ with said concentration $c2<100$ ppm.

3. The method of claim 1 wherein said water concentration of said liquid electrolyte of said pre-assembly set of properties includes a concentration $c1$ with said concentration $c1<1,000$ ppm, and wherein said water concentration of said liquid electrolyte of said post-communication set of properties includes a concentration $c2$ with said concentration $c2<20$ ppm.

4. The method of claim 1 wherein said component includes at least one of said electrodes and wherein said at least one electrode contains an active material including a transition metal cyanide coordination compound material.

5. The method of claim 1 wherein said component includes said anode electrode and said cathode electrode and wherein each of said electrodes contains an active material including a transition metal cyanide coordination compound material having a composition conforming to formula I, formula I including $A_xP_y[R(CN)_6]_z(H_2O)_n$;

wherein A represents an alkali cation and P and R each represent a multivalent transition metal cation;

wherein $0.5<z<1$; and wherein x, y, and z are related based on electrical neutrality, $x>0$, $y>0$, $z>0$;

and wherein $n=6*(1-z)+m_k$, with $n>0$, with $k=0$ identifying as an as-synthesized material and $k=1$ to 4 identifying as a set of post-synthesized states for each particular electrode of said electrodes, and with $6*(1-z)$ identifying as a quantity of coordinated water of said compound material, and with each $m_k>0$, each $m_k$ identifying as a quantity of interstitial water of said compound material for one of said states of said particular electrode, with each said quantity $m_k$ of interstitial water being equivalent to a weight percentage $M_k=m_k*W_{H2O}/W_{dry}*100\%$, with $W_{H2O}$ being the molecular weight of water and $W_{dry}$ being the molecular weight for the composition of formula I excluding all of its water content, with each particular one of said electrodes including an $M_0$ identifying as an as-synthesized set of properties for said particular electrode, with $M_1$ identifying as a pre-communication set of properties for said anode electrode, with $M_2$ identifying as a pre-communication set of properties for said cathode electrode, with $M_3$ identifying as a post-communication set of properties for said anode electrode, and with $M_4$ identifying as a post-communication set of properties for said cathode electrode; and wherein said liquid electrolyte includes a polar organic solvent combined with an alkali metal salt and water having a water concentration, said water concentration including a pre-communication water concentration c1 and including a post-communication water concentration c2 and wherein $c1>c2$;

wherein said as-synthesized set of properties includes, for each said particular electrode, $M_0$ up to 45% for a set of as-synthesized materials, said set of as-synthesized materials including said composition of formula I;

wherein said $M_1$ includes a range between 1% and 12% for a set of anode electrode materials of said anode electrode with $M_1 \leq M_3$, said set of anode electrode materials including said composition of formula I wherein said $M_2$ includes a range between 1% and 12% for a set of cathode electrode materials of said cathode electrode with $M_2 \leq M_4$, said set of cathode electrode materials including said composition of formula I and wherein $M_3+M_4>M_1+M_2$.

* * * * *